US011381182B2

(12) United States Patent
Yokozawa et al.

(10) Patent No.: US 11,381,182 B2
(45) Date of Patent: Jul. 5, 2022

(54) VEHICLE DOOR OPENING/CLOSING DEVICE

(71) Applicant: MITSUBA Corporation, Gunma (JP)

(72) Inventors: Ikuharu Yokozawa, Gunma (JP); Ryuichi Nakajima, Gunma (JP)

(73) Assignee: MITSUBA Corporation, Gunma (JP)

( * ) Notice: Subject to any disclaimer, the term of this patent is extended or adjusted under 35 U.S.C. 154(b) by 67 days.

(21) Appl. No.: 17/053,065

(22) PCT Filed: Feb. 18, 2019

(86) PCT No.: PCT/JP2019/005813
§ 371 (c)(1),
(2) Date: Nov. 4, 2020

(87) PCT Pub. No.: WO2019/234981
PCT Pub. Date: Dec. 12, 2019

(65) Prior Publication Data
US 2021/0230923 A1    Jul. 29, 2021

(30) Foreign Application Priority Data
Jun. 6, 2018    (JP) .............................. JP2018-108272

(51) Int. Cl.
*H02P 6/06*    (2006.01)
*H02P 6/08*    (2016.01)
(Continued)

(52) U.S. Cl.
CPC .................. *H02P 6/08* (2013.01); *H02P 6/06* (2013.01); *E05F 15/622* (2015.01);
(Continued)

(58) Field of Classification Search
CPC .... H02P 6/06; E05F 15/622; E05Y 2201/434; E05Y 2201/70; E05Y 2201/702; E05Y 2400/36; E05Y 2900/546
(Continued)

(56) References Cited

U.S. PATENT DOCUMENTS 6,150,781 A    11/2000    Hollerbach
7,808,197 B2 *    10/2010    Kimura ...................... B60J 5/10
318/469

(Continued)

FOREIGN PATENT DOCUMENTS

CN    102470735    5/2012
CN    103187922    7/2013
(Continued)

OTHER PUBLICATIONS

"International Search Report (Form PCT/ISA/210) of PCT/JP2019/005813," dated Mar. 19, 2019, with English translation thereof, pp. 1-3.
(Continued)

*Primary Examiner* — Jorge L Carrasquillo
(74) *Attorney, Agent, or Firm* — JCIPRNET

(57) ABSTRACT

Provided is a vehicle door opening/closing device. Given that a door is in an initial fully-open position, a storage unit stores: a target speed map for defining a relation between the door position and the target speed of a motor; and information indicative of an arbitrary fully open position set by a user. A map speed computation unit calculates a map speed based on the target speed map, whereas a gradually decreasing speed calculation unit calculates a gradually decreasing target speed for decreasing at a prescribed deceleration rate as the arbitrary fully open position gets closer so that a prescribed terminal speed is reached at the arbitrary fully open position. A speed sequence control unit switches a set
(Continued)

target speed to the gradually decreasing target speed from the map speed at a door position where the gradually decreasing target speed becomes slower than the map speed.

5 Claims, 11 Drawing Sheets

(51) Int. Cl.
    *E05F 15/611*     (2015.01)
    *B60J 5/10*     (2006.01)
    *E05F 15/622*     (2015.01)

(52) U.S. Cl.
    CPC ..... *E05Y 2201/434* (2013.01); *E05Y 2201/70* (2013.01); *E05Y 2201/702* (2013.01); *E05Y 2400/36* (2013.01); *E05Y 2900/546* (2013.01); *H02P 2205/07* (2013.01)

(58) Field of Classification Search
    USPC .......................................................... 318/163
    See application file for complete search history.

(56) References Cited

U.S. PATENT DOCUMENTS

| | | | | |
|---|---|---|---|---|
| 2002/0093301 | A1* | 7/2002 | Itami | ..................... E05F 15/632 318/443 |
| 2005/0275363 | A1* | 12/2005 | Honma | ................ H02H 7/0851 318/280 |
| 2011/0043158 | A1* | 2/2011 | Yuasa | .................... B60N 2/856 318/599 |

FOREIGN PATENT DOCUMENTS

| | | |
|---|---|---|
| CN | 104114799 | 10/2014 |
| CN | 105320153 | 2/2016 |
| CN | 106437390 | 2/2017 |
| JP | 2002194948 | 7/2002 |
| JP | 2004189009 | 7/2004 |
| JP | 2006183391 | 7/2006 |
| JP | 2015074907 | 4/2015 |
| JP | 2017036602 | 2/2017 |

OTHER PUBLICATIONS

"Office Action of Japan Counterpart Application", dated Aug. 3, 2021, with English translation thereof, p. 1-p. 12.

"Office Action of China Counterpart Application", dated Sep. 28, 2021, with English translation thereof, p. 1-p. 23.

"Written Opinion of the International Searching Authority (Form PCT/ISA/237)" of PCT/JP2019/005813, dated Mar. 19, 2019, with English translation thereof, pp. 1-10.

* cited by examiner

VEHICLE DOOR OPENING/CLOSING DEVICE

CROSS-REFERENCE TO RELATED APPLICATION

This application is a 371 application of the International PCT application Ser. No. PCT/JP2019/005813, filed on Feb. 18, 2019, which claims the priority benefit of Japanese Patent Application No. 2018-108272, filed on Jun. 6, 2018. The entirety of each of the above-mentioned patent applications is hereby incorporated by reference herein and made a part of this specification.

TECHNICAL FIELD

The present invention relates to a vehicle door opening/closing device having an automatic opening control function which automatically controls opening of a door.

RELATED ART

Patent Literature 1 discloses a door opening/closing device that sets a corrected acceleration end position according to a remaining distance of movement in a direction of closing a door when an operation of closing the door is started from an intermediate position of opening/closing a sliding door and then accelerates the door to the corrected acceleration end position. In other words, it discloses a method in which a maximum speed of the door is changed according to the remaining distance of movement at the time of starting the operation of closing the door. Patent Literature 2 discloses a door opening/closing device that reduces a target speed of a back door at a predetermined deceleration until the back door stops when a stop command is issued during execution of automatic opening/closing control of the back door.

CITATION LIST

Patent Literature

Patent Literature 1: Japanese Patent Application Laid-Open No. 2006-183391
Patent Literature 2: Japanese Patent Application Laid-Open No. 2017-36602

SUMMARY OF INVENTION

Technical Problem

As described in Patent Literature 2, a vehicle including a device (referred to as a power tailgate device in the specification) that automatically controls opening/closing of a tailgate (back door) is known. For example, a method of opening the tailgate according to automatic opening control can be controlled based on a target speed map that determines a relationship between a position and a target speed. On the other hand, there are cases in which a memory function with which a fully open position can be arbitrarily changed by an operation of a user is incorporated in a power tailgate device. In a case in which the fully open position is changed, for example, when automatic opening control is performed based on a target speed map that has been created before the fully open position is changed, the fully open position is reached in a high speed state, and thus vibration of the back door may occur.

The present invention has been made in view of such problems, and an objective thereof is to provide a vehicle door opening/closing device in which vibration of a door during automatic opening control can be suppressed.

Solution to Problem

A vehicle door opening/closing device of the present invention includes a motor which outputs a driving force to open and close a door, and a motor control unit which sets a target speed of the motor at the time of automatic opening control of the door and controls a rotation state of the motor according to a set target speed which is the target speed that has been set, in which the motor control unit includes a storage unit which stores a target speed map which defines a relationship between a position of the door and a target speed of the motor on the premise that a fully open position of the door is an initial fully open position, and information indicating an arbitrary fully open position of the door set by a user, a map speed calculation unit which calculates a map speed serving as a target speed of the motor based on the target speed map, a gradually decreasing speed calculation unit which calculates a gradually decreasing target speed that decelerates at a predetermined deceleration rate as a position of the door approaches the arbitrary fully open position so that a predetermined terminal speed is reached at the arbitrary fully open position, and a speed sequence control unit which compares the map speed with the gradually decreasing target speed and switches the set target speed from the map speed to the gradually decreasing target speed at a position of the door at which the gradually decreasing target speed becomes lower than the map speed.

In another aspect of the present invention, the map speed calculation unit may calculate the map speed corresponding to a detected present position of the door for each predetermined control cycle, the gradually decreasing speed calculation unit may calculate the gradually decreasing target speed corresponding to the present position for each predetermined control cycle, and the speed sequence control unit may compare the map speed with the gradually decreasing target speed for each predetermined control cycle.

In another aspect of the present invention, the gradually decreasing target speed may be calculated by "$\omega^*d = \omega^*ed + |\Delta\omega d| \times Wp$", where a difference amount between the arbitrary fully open position and the present position is "Wp," the terminal speed is "$\omega^*ed$," and the deceleration rate is "$\Delta\omega d$."

In another aspect of the present invention, the motor control unit may further include a gradually increasing speed calculation unit which calculates a gradually increasing target speed that accelerates at a predetermined acceleration rate as a position of the door approaches the arbitrary fully open position with a predetermined start speed as a starting point, and the speed sequence control unit may set the set target speed as the gradually increasing target speed when a detected actual speed of the motor has reached the start speed, may compare the map speed with the gradually increasing target speed, and may switch the set target speed from the gradually increasing target speed to the map speed at a position of the door at which the gradually increasing target speed becomes higher than the map speed.

In another aspect of the present invention, the speed sequence control unit may further compare the gradually increasing target speed with the gradually decreasing target speed, and may switch the set target speed from the gradually increasing target speed to the gradually decreasing target speed at a position of the door at which the gradually decreasing target speed becomes lower than the gradually increasing target speed.

In another aspect of the present invention, the gradually increasing speed calculation unit may calculate the gradually increasing target speed corresponding to the present position for each predetermined control cycle, and the speed sequence control unit may compare the gradually increasing target speed with each of the map speed and the gradually decreasing target speed for each predetermined control cycle.

In another aspect of the present invention, the door may be a tailgate.

Advantageous Effects of Invention

According to the present invention, vibration of the door during automatic opening control can be suppressed.

DESCRIPTION OF EMBODIMENTS

Hereinafter, embodiments of the present invention will be described in detail with reference to the drawings.

<<Outline of vehicle door opening/closing device>>

Figure 1:
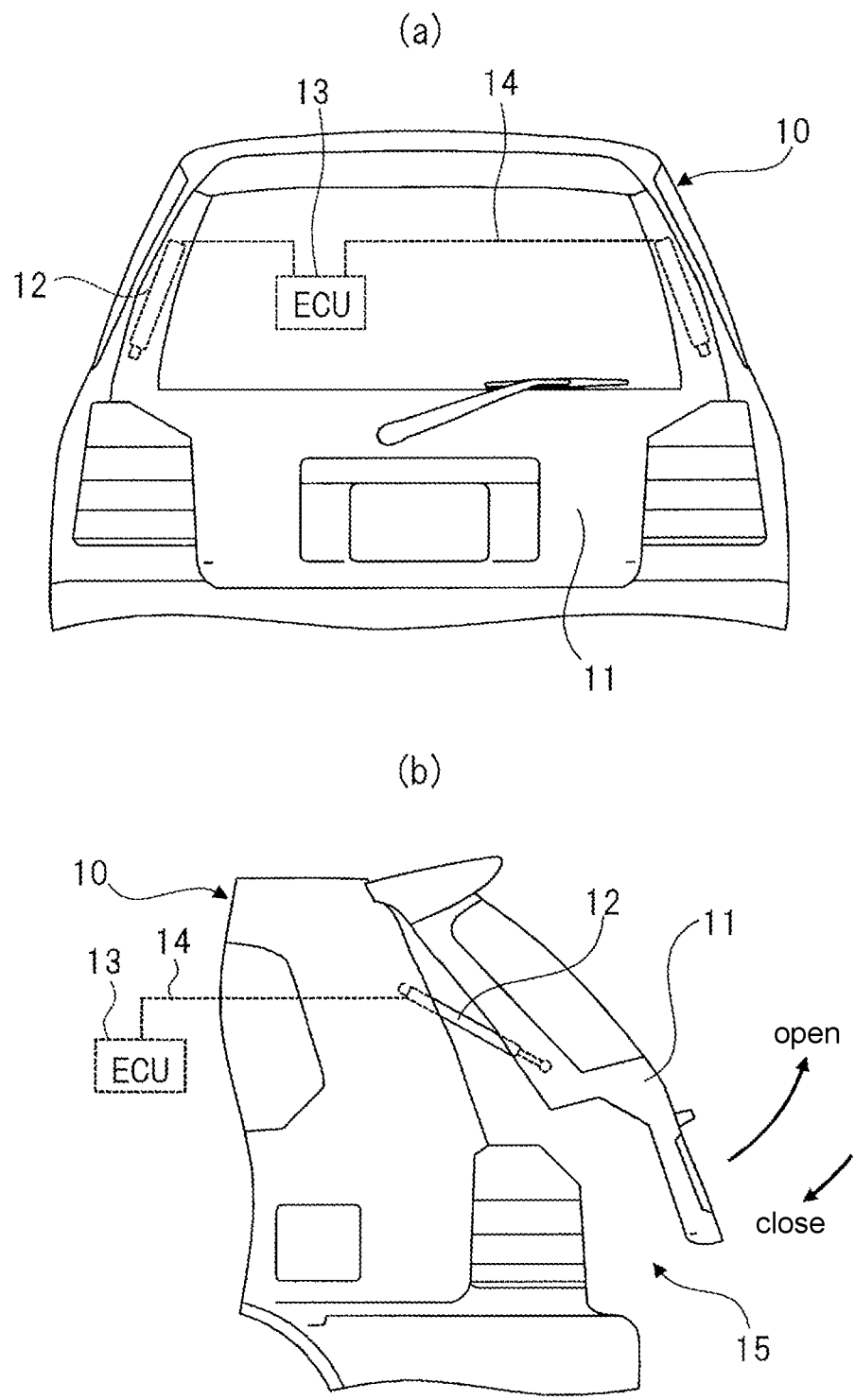
FIG. 1 includes part (a) and (b), in which part (a) of FIG. 1 is a front view illustrating a schematic configuration example from the rear of a vehicle to which a vehicle door opening/closing device according to one embodiment of the present invention is applied, and part (b) of FIG. 1 is a side view of part (a) of FIG. 1.

Part (a) of FIG. 1 is a front view illustrating a schematic configuration example from the rear of a vehicle to which a vehicle door opening/closing device according to one embodiment of the present invention is applied, and part (b) of FIG. 1 is a side view of part (a) of FIG. 1. A so-called hatchback type vehicle 10 is illustrated in FIG. 1. A tailgate (back door) 11, which is an example of a door, is provided at a rear portion of the vehicle 10. Part (b) of FIG. 1 illustrates a state in which an opening 15 that allows luggage or the like to be put in and taken out of an interior of the vehicle by opening the tailgate 11 is formed. The tailgate 11 rotates with a hinge (not illustrated) provided on a ceiling part of the vehicle 10 as a center, and a size of the opening 15 changes according to a rotation angle thereof The vehicle 10 includes a door opening/closing device (power tailgate device) for controlling the rotation of the tailgate 11 (opening/closing of the tailgate 11). The door opening/closing device includes an actuator 12 having a telescopic structure and a controller (electronic control unit (ECU)) 13 that controls the actuator 12. Two actuators 12 are provided on both left and right sides of the vehicle 10, one end of each is fixed to a vehicle main body, and the other end is fixed to the tailgate 11. An open/closed state of the tailgate 11 is controlled according to extension/contraction of the actuator 12. The controller (ECU) 13 controls the open/closed state of the tailgate 11 by controlling the actuator 12 via a cable 14 according to an operation of a user.

Figure 2:
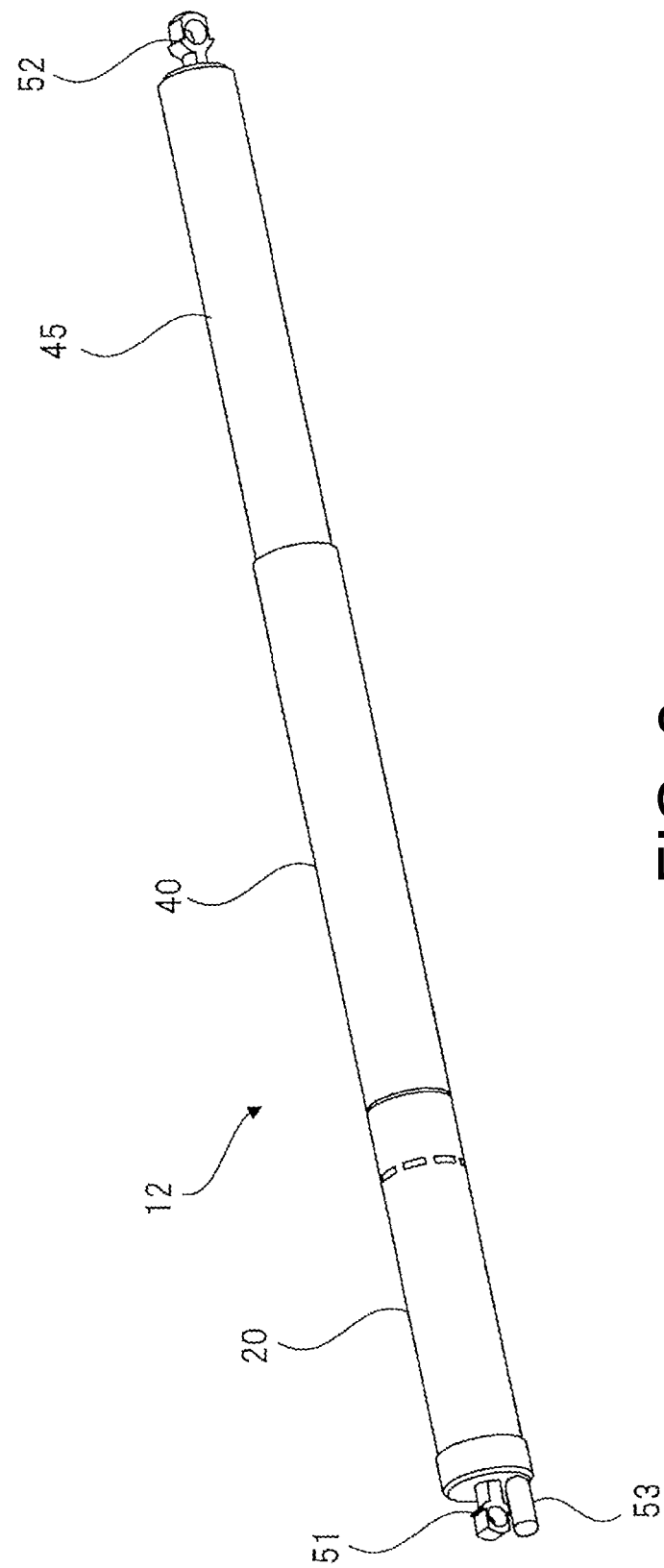
FIG. 2 is a perspective view illustrating a structural example of an actuator in FIG. 1.
Figure 3:
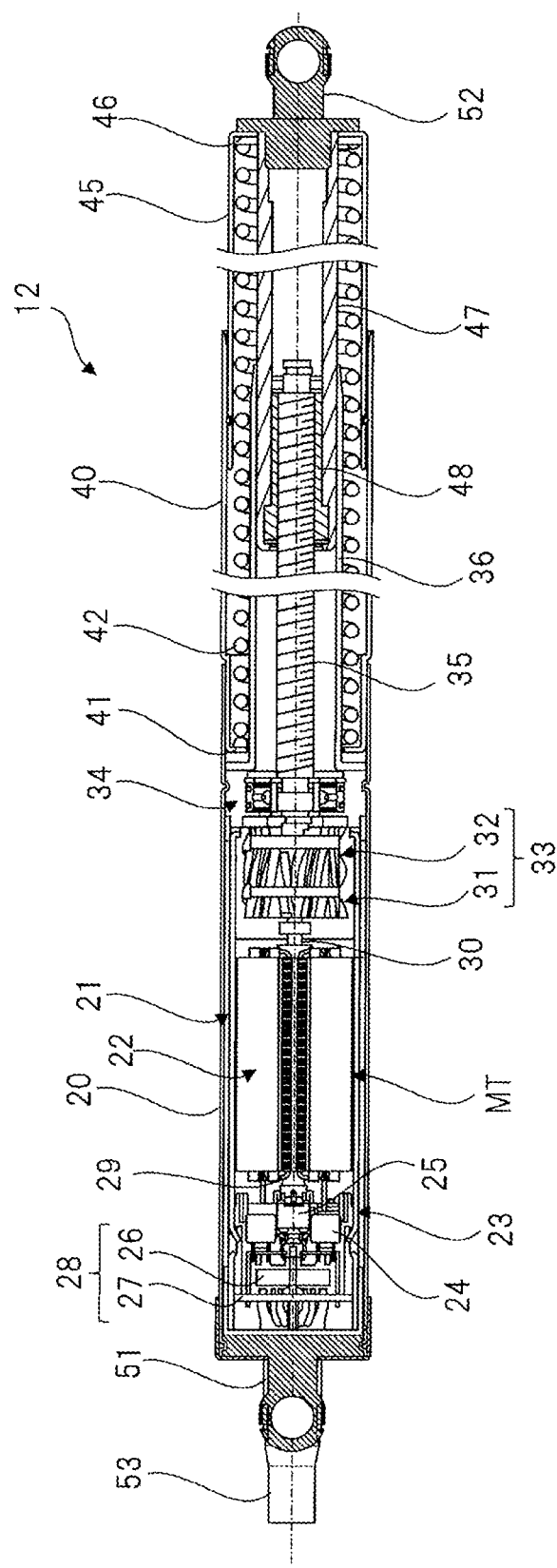
FIG. 3 is a cross-sectional view illustrating a structural example of the actuator of FIG. 2 in a longitudinal direction.

FIG. 2 is a perspective view illustrating a structural example of the actuator in FIG. 1, and FIG. 3 is a cross-sectional view illustrating a structural example of the actuator of FIG. 2 in a longitudinal direction. The actuator 12 illustrated in FIG. 2 performs an extending/contracting motion using a feed screw method using a motor. As illustrated in FIG. 2, the actuator 12 has substantially a rod-like shape. The actuator 12 includes a housing [1] 20, a housing [2] 40, and housing [3] 45 which have substantially cylindrical shapes, fixing parts 51 and 52, and a connector part 53. The housing [2] 40 is fitted to the housing [1] 20, and the housing [3] 45 is mounted to be extendable and contractible with respect to the housing [2] 40.

The fixing parts 51 and 52 are provided at opposite ends of the actuator 12 in the longitudinal direction. The fixing part 51 and the fixing part 52 each have openings into which fixing pins (not illustrated) each provided in the vehicle main body and the tailgate 11 are inserted. Thereby, the actuator 12 is connected to the vehicle main body and the tailgate 11 to be rotatable with each of the fixing pins as a center as illustrated in FIG. 1. The connector part 53 is provided in the vicinity of the fixing part 51 and serves as an insertion port of the cable 14 for the controller (ECU) 13 as illustrated in FIG. 1.

As illustrated in FIG. 3, a motor MT is housed in the housing 20. In this example, a brushed DC motor is used as the motor MT. The motor MT includes a substantially cylindrical yoke 21 and a magnet (not illustrated) fixed to an inner circumferential surface of the yoke 21, a motor shaft (motor shaft) 30, an armature (rotor) 22 that rotates together with the motor shaft 30 inside the yoke 21, and a brush holder unit 23 that supplies power to the armature 22. The armature 22 includes a coil 29 and a commutator 25 connected to an end portion of the coil 29.

The motor shaft 30 extends in a longitudinal direction, in which one end thereof is inserted into the brush holder unit 23, and the other end is connected to a speed reduction mechanism unit 33 to be described below. The brush holder unit 23 includes a brush 24 that is in sliding contact with the commutator 25. A drive current from the controller (ECU) 13 is supplied to the brush 24 via the connector part 53. The drive current is applied to the coil 29 of the armature 22 via the brush 24 and the commutator 25. As a result, an electromagnetic force is generated in the armature 22, and the armature 22 rotates together with the motor shaft 30 in a predetermined rotation direction and at a predetermined rotation speed.

Also, the brush holder unit 23 includes a sensor magnet 26 attached to one end of the motor shaft 30 and a sensor substrate 27 installed to face the sensor magnet 26. The sensor magnet 26 and the sensor substrate 27 function as a motor shaft sensor 28 that detects a rotation angle of the motor MT. The sensor substrate 27 is equipped with a magnetic detection element that detects a magnetic change when the motor shaft 30 (and thus the sensor magnet 26) rotates, and outputs a predetermined detection signal (for example, an ABZ signal or a UVW signal) based on the detection result. The detection signal is transmitted from the connector part 53 to the controller (ECU) 13.

The speed reduction mechanism unit 33 includes two-stage speed reduction mechanisms 31 and 32 constituted by, for example, a planetary gear speed reducer or the like. The speed reduction mechanisms 31 and 32 decelerate rotation of the motor shaft 30 at a predetermined speed reduction ratio and transmit it to an output shaft (output shaft) 35. The output shaft 35 extends in the longitudinal direction, and one end thereof is rotatably supported by a bearing holder 34 installed adjacent to the speed reduction mechanism unit 33. The output shaft 35 is a so-called trapezoidal thread, and a thread groove is formed on an outer circumferential surface thereof. Then, the housing [2] 40 is provided to cover a periphery of such an output shaft 35.

The housing [2] 40 includes a coil spring 42 provided to extend spirally along an inner circumferential surface thereof. One end of the coil spring 42 is in contact with a flange 41 of the housing [2] 40. Also, a substantially cylindrical guide tube 36 is housed in the housing [2] 40. The guide tube 36 guides movement of an inner tube 47 to be described below. Also, one end of the guide tube 36 is in contact with a bearing holder 34 via the flange.

The housing [3] 45 is mounted to be extendable and contractible with respect to the housing [2] 40. The coil spring 42 extends in the housing [3] 45. A flange 46 is formed at one end of the housing [3] 45. The other end of the coil spring 42 is in contact with one surface of the flange 46, and the fixing part 52 is in contact with the other surface thereof. The fixing part 52 is screwed into the inner tube 47 by a screw structure and is integrally fixed to the inner tube 47.

The inner tube 47 is slidably inserted into the guide tube 36 in the longitudinal direction. A nut member 48 is provided at one end of the inner tube 47. The nut member 48 is integrally fixed to the inner tube 47. Also, the inner tube 47 is integrally fixed to the fixing part 52 and the housing [3] 45. Therefore, the nut member 48 cannot perform a rotation motion with a rotating shaft of the motor MT as a center in a state in which the fixing part 52 is connected to the tailgate 11. Thereby, the nut member 48 moves in the longitudinal direction (rotating shaft direction) via a screw connection with the output shaft 35 in accordance with rotation of the output shaft 35. Along with this, the inner tube 47, the fixing part 52, and the housing [3] 45 which are directly or indirectly fixed to the nut member 48 also move.

With such a structure, for example, when the motor MT is caused to rotate in a forward direction, the output shaft 35 rotates at a predetermined speed reduction ratio, and the housing [3] 45 moves in a direction of coming out of the housing [2] 40 accordingly. As a result, the actuator 12 is controlled in an extending direction, and the tailgate 11 is controlled in an opening direction. On the other hand, when the motor MT is caused to rotate in a reverse direction, the housing [3] 45 moves in a direction of entering the housing [2] 40. As a result, the actuator 12 is controlled in a contracting direction, and the tailgate 11 is controlled in a closing direction.

Also, the coil spring 42 always biases the housing [3] 45 in a direction of coming out of the housing [2] 40. That is, a length of the coil spring 42 is adjusted to have such a biasing force in advance. Therefore, for example, even when an operation of the motor MT is stopped with the actuator 12 extended, the extended state is maintained by the biasing force of the coil spring 42.

<<Outline around controller (ECU)>>

Figure 4:
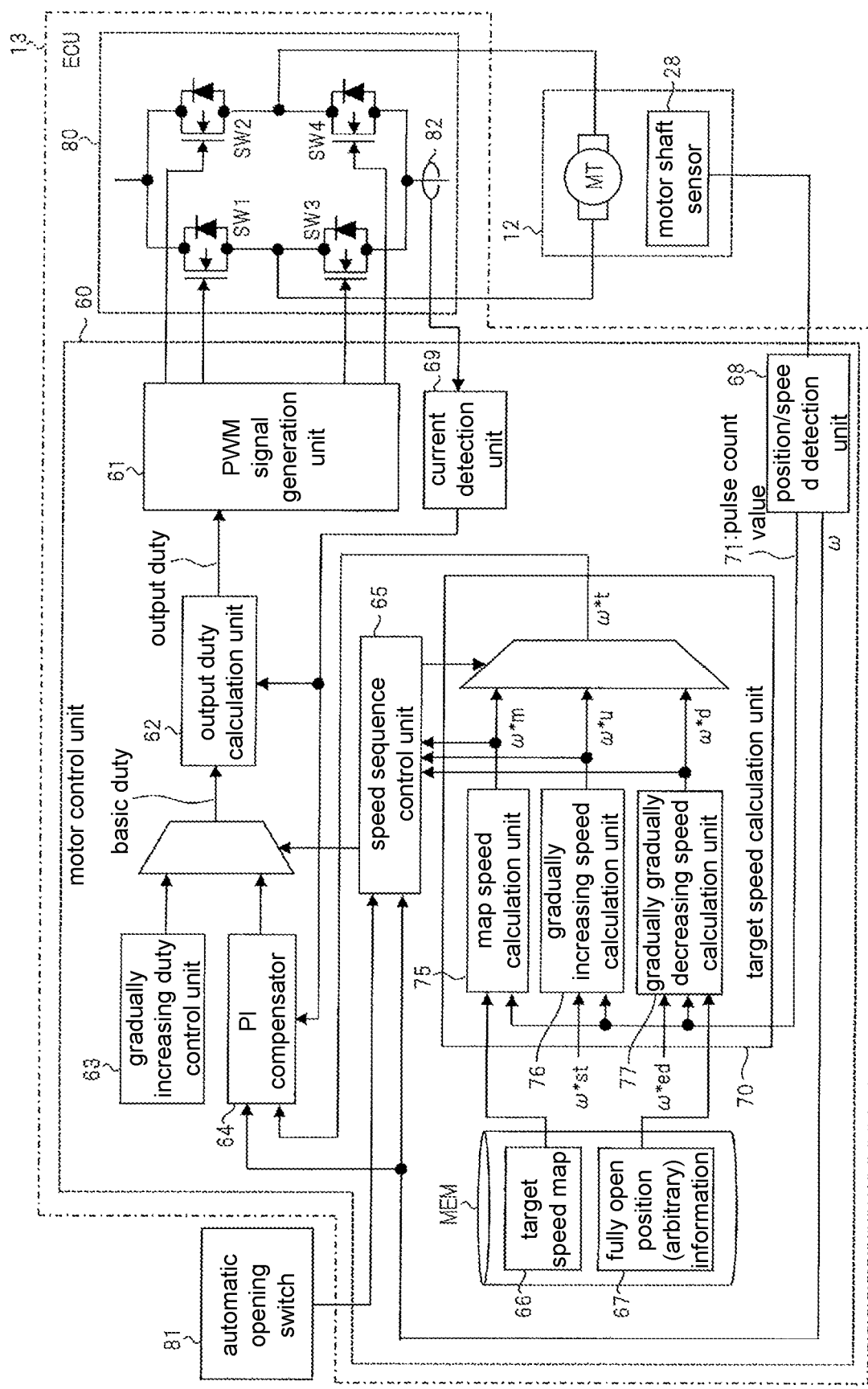
FIG. 4 is a schematic diagram showing a configuration example of a main part around a controller (ECU) in FIG. 1.

FIG. 4 is a schematic diagram showing a configuration example of a main part around the controller (ECU) in FIG. 1. The controller (ECU) 13 shown in FIG. 4 includes a motor control unit 60 and a driver unit 80. The driver unit 80 includes switching elements SW1 to SW4 that form an H-bridge circuit. Two output terminals of the H-bridge circuit are connected to the motor MT (each brush 24 thereof (see FIG. 3)) via the cable 14 of FIG. 1 and the connector part 53 of FIG. 2.

The motor control unit 60 is configured by, for example, a microcontroller including a central processing unit (CPU). The motor control unit 60 includes a pulse width modulation (PWM) signal generation unit 61, an output duty calculation unit 62, a gradual duty increase control unit 63, and a proportional/integral (PI) compensator 64. Further, the motor control unit 60 includes a speed sequence control unit 65, a storage unit MEM, a position/speed detection unit 68, a current detection unit 69, and a target speed calculation unit 70. The storage unit MEM is configured by, for example, a non-volatile memory or the like. The PWM signal generation unit 61 and the position/speed detection unit 68 are mainly configured by a counter or the like. The current detection unit 69 is mainly constituted by an analog-digital converter or the like. Portions other than these are mainly configured by program processing of the CPU.

The motor MT outputs a driving force to open and close the tailgate 11 by being incorporated in the actuator 12 as described in FIGS. 2 and 3. The motor control unit 60 performs automatic opening control of the tailgate 11 according to an automatic opening switch 81 which may be, for example, a switch or a remote-control switch near a driver's seat. During the automatic opening control, schematically, the motor control unit 60 sets a target speed of the motor MT using the speed sequence control unit 65 and the target speed calculation unit 70, and controls a rotation state of the motor MT and an open/closed state of the tailgate 11 using a set target speed $\omega^*t$ which is the set target speed.

As described in FIG. 3, the motor shaft sensor 28 in the actuator 12 detects a rotation angle of the motor shaft (motor shaft) 30 and outputs a pulse signal each time the motor shaft 30 rotates a predetermined angle. The position/speed detection unit 68 counts the pulse signal to output a pulse count value 71 indicating a position of the tailgate 11. That is, the rotation angle of the motor shaft 30 is detected by the count value of the pulse signal, a rotation angle of the output shaft 35 is detected based on a predetermined speed reduction ratio, and as a result, a position of the tailgate 11 is detected. Also, the position/speed detection unit 68 detects an actual speed $\omega$ of the motor MT based on a rate of change of the rotation angle of the motor shaft 30. The current detection unit 69 detects a drive current of the motor MT by detecting a current flowing through the driver unit 80 with a current sensor 82 interposed therebetween.

Although details will be described below, the target speed calculation unit 70 includes a map speed calculation unit 75 that calculates a map speed $\omega^*m$, a gradually increasing speed calculation unit 76 that calculates a gradually increasing target speed ω*u, and a gradually decreasing speed calculation unit 77 that calculates a gradually decreasing target speed ω*d. The target speed calculation unit 70 selects one of the map speed ω*m, the gradually increasing target speed ω*u, and the gradually decreasing target speed ω*d and outputs it as the set target speed ω*t according to an instruction from the speed sequence control unit 65.

The PI compensator 64 calculates an amount of manipulation (for example, a current command value (a torque command value)) for bringing an error between the set target speed ω*t from the target speed calculation unit 70 and the actual speed ω from the position/speed detection unit 68 close to zero using PI control. Further, the PI compensator 64 calculates an amount of manipulation (for example, a voltage command value) for bringing an error between the current command value and a drive current value from the current detection unit 69 close to zero using the PI control. This voltage command value represents a duty of the PWM signal.

The gradual duty increase control unit 63 generates a duty that gradually increases at a predetermined rate [%/ms] from a predetermined initial duty [%]. The speed sequence control unit 65 selects either the duty from the gradual duty increase control unit 63 or the duty from the PI compensator 64 and outputs it as a basic duty. The output duty calculation unit 62 determines a final output duty by performing various duty corrections on the basic duty or performing various protections based on the drive current value or the like from the current detection unit 69.

The PWM signal generation unit 61 generates a PWM signal having the output duty from the output duty calculation unit 62 and performs switching control on each of the switching elements SW1 to SW4 in the driver unit 80 using the PWM signal. Specifically, when the motor MT is rotated in a forward direction (and when the actuator 12 is extended), the PWM signal generation unit 61 fixes the switching elements SW2 and SW3 to OFF and controls the switching elements SW1 and SW4 with the PWM signal. On the other hand, when the motor MT is rotated in a reverse direction (and when the actuator 12 is contracted), the PWM signal generation unit 61 fixes the switching elements SW1 and SW4 to OFF and controls the switching elements SW2 and SW3 with the PWM signal.

Figure 5:
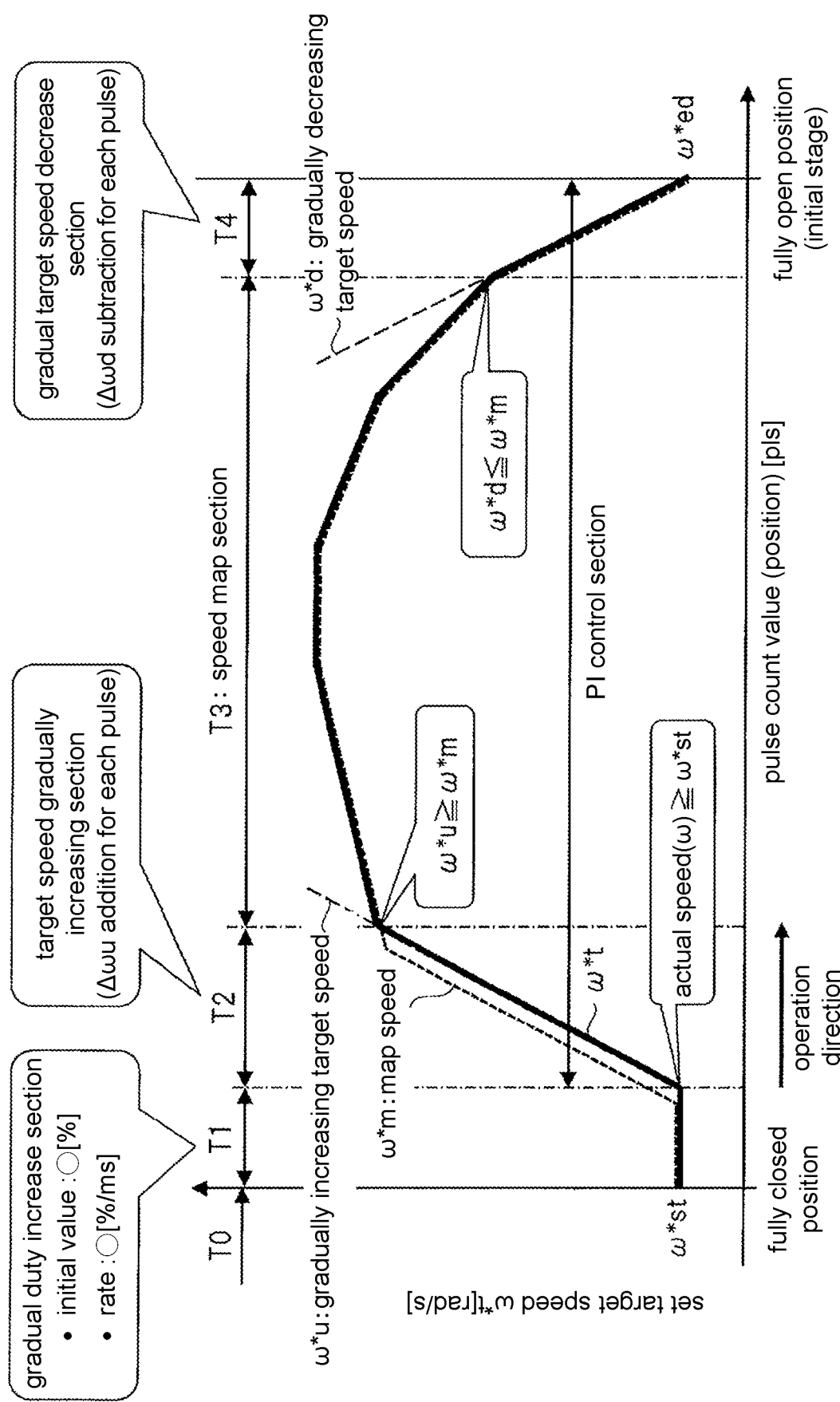
FIG. 5 is a view showing a schematic operation example at the time of automatic opening control when a fully open position is an initial fully open position in a motor control unit of FIG. 4.

FIG. 5 is a view showing a schematic operation example at the time of automatic opening control when a fully open position is an initial fully open position in the motor control unit of FIG. 4. FIG. 5 shows a relationship between the pulse count value 71 (that is, a position of the tailgate 11) and the set target speed ω*t which are shown in FIG. 4. The automatic opening control from the fully closed position to the initial fully open position is performed in order through an initial setting section T0, a gradual duty increase section T1, a gradual target speed increase section T2, a speed map section T3, and a gradual target speed decrease section T4.

In the initial setting section T0, the motor control unit 60 sets a predetermined start speed ω*st and an initial duty [%] as appropriate for the gradual duty increase control unit 63, the speed sequence control unit 65, and the target speed calculation unit 70 according to the automatic opening switch 81. In the gradual duty increase section T1, the gradual duty increase control unit 63 generates a duty that gradually increases at a predetermined rate [%/ms] from the initial duty [%] for each predetermined control cycle (for example, 5 ms or the like). The motor MT gradually accelerates as the duty increases.

The speed sequence control unit 65 compares the set start speed ω*st with the actual speed ω from the position/speed detection unit 68, and selects the duty from the gradual duty increase control unit 63 as the basic duty until the actual speed ω reaches the start speed ω*st. On the other hand, the speed sequence control unit 65 selects the duty from the PI compensator 64 as the basic duty when the actual speed ω has reached the start speed ω*st, and sets the gradually increasing target speed ω*u from the gradually increasing speed calculation unit 76 as the set target speed ω*t from the target speed calculation unit 70. Thereby, in the gradual target speed increase section T2, the motor MT is controlled with the gradually increasing target speed ω*u from the gradually increasing speed calculation unit 76 as the set target speed ω*t.

The gradually increasing speed calculation unit 76 calculates the gradually increasing target speed ω*u that accelerates at a predetermined acceleration rate as the position of the tailgate 11 approaches the fully open position (with the position away from the fully closed position) with the start speed ω*st as a starting point. The position of the tailgate 11 is equivalent to the pulse count value 71. Specifically, with the pulse count value 71 at the time of transition occurring from the gradual duty increase section T1 to the gradual target speed increase section T2 as a reference, the gradually increasing target speed ω*u is a speed that accelerates from the start speed ω*st at an acceleration rate Δωu according to increase in an amount of displacement from the reference. The acceleration rate Δωu is determined by, for example, an increment in the target speed with respect to an increase of "+1" in the pulse count value.

Here, in the motor control unit 60 of FIG. 4, the storage unit MEM stores the target speed map 66 created in advance. The target speed map 66 defines a relationship between the position of the tailgate 11 (that is, the pulse count value 71) and the target speed of the motor MT on the premise that the fully open position of the tailgate 11 is the initial fully open position. The map speed calculation unit 75 recognizes a present position of the tailgate 11 based on the pulse count value 71, and calculates the map speed ω*m, which is a target speed of the motor MT corresponding to the present position, based on the target speed map 66. FIG. 5 shows the map speed ω*m calculated in this way.

In the gradual target speed increase section T2, the acceleration rate Δωu in the gradually increasing speed calculation unit 76 is set to a value equivalent to an acceleration rate based on the map speed ω*m in this example. Also, in the gradual target speed increase section T2, the speed sequence control unit 65 compares the map speed ω*m with the gradually increasing target speed ω*u. Then, the speed sequence control unit 65 switches the set target speed ω*t from the gradually increasing target speed ω*u to the map speed ω*m at a position of the tailgate 11 (the pulse count value 71) at which the gradually increasing target speed ω*u becomes higher than the map speed ω*m. Thereby, in the speed map section T3, the motor MT is controlled with the map speed ω*m from the map speed calculation unit 75 as the set target speed ω*t.

Further, in principle, the speed of the motor MT may be controlled based on the map speed ω*m. However, in this example, in order to stabilize control at the time of starting the motor MT, the gradual duty increase section T1 with "ω≥ω*st" as an end condition is provided. In this case, it is difficult to identify the position of the tailgate 11 (the pulse count value 71) at which the end condition occurs. Particularly, when the vehicle 10 illustrated in FIG. 1 is stopped on a slope or the like, the position of the tailgate 11 may change according to a degree of inclination or the like. In such a situation, when transition is assumed to be made from the gradual duty increase section T1 to the speed map section T3 at the time when the end condition occurs, there is a likelihood that a rapid change in the set target speed $\omega^*t$ will occur at the time of the transition and this will cause instability of the control. Therefore, here, the gradual target speed increase section T2 is provided.

Also, in the motor control unit 60 of FIG. 4, the gradually decreasing speed calculation unit 77 calculates the gradually decreasing target speed $\omega^*d$ that decelerates at a predetermined deceleration rate $\Delta\omega d$ as the position of the tailgate 11 approaches the fully open position so that a predetermined terminal speed $\omega^*ed$ is reached at the fully open position (here, the initial fully open position). As described above, the position of the tailgate 11 is equivalent to the pulse count value 71. Specifically, with the pulse count value 71 at the fully open position as a reference, the gradually decreasing target speed $\omega^*d$ is a speed that decelerates to the terminal speed $\omega^*ed$ at the deceleration rate $\Delta\omega d$ according to decrease in an amount of displacement toward the reference. The deceleration rate $\Delta\omega d$ is determined by, for example, a decrement in the target speed with respect to an increase of "+1" in the pulse count value.

In the speed map section T3, the speed sequence control unit 65 compares the map speed $\omega^*m$ with the gradually decreasing target speed $\omega^*d$. Then, the speed sequence control unit 65 switches the set target speed $\omega^*t$ from the map speed $\omega^*m$ to the gradually decreasing target speed $\omega^*d$ at a position of the tailgate 11 (the pulse count value 71) at which the gradually decreasing target speed $\omega^*d$ becomes lower than the map speed $\omega^*m$. Thereby, in the gradual target speed decrease section T4, the motor MT is controlled with the gradually decreasing target speed $\omega^*d$ from the gradually decreasing speed calculation unit 77 as the set target speed $\omega^*t$. Further, the deceleration rate $\Delta\omega d$ in the gradually decreasing speed calculation unit 77 is set to a value equivalent to a deceleration rate based on the map speed $\omega^*m$ in this example. In this case, in the gradual target speed decrease section T4, the gradually decreasing target speed $\omega^*d$ is equivalent to the map speed $\omega^*m$.

As described above, when the automatic opening control as shown in FIG. 5 is used, the opening speed of the tailgate 11 can be stably controlled at a desired speed from the fully closed position to the fully open position, and particularly, the opening speed can be gradually reduced to reach the terminal speed $\omega^*ed$ at the fully open position. As a result, vibration of the tailgate 11 due to the automatic opening control can be suppressed. Also, along with this, a feeling of the user can be improved.

Figure 6:
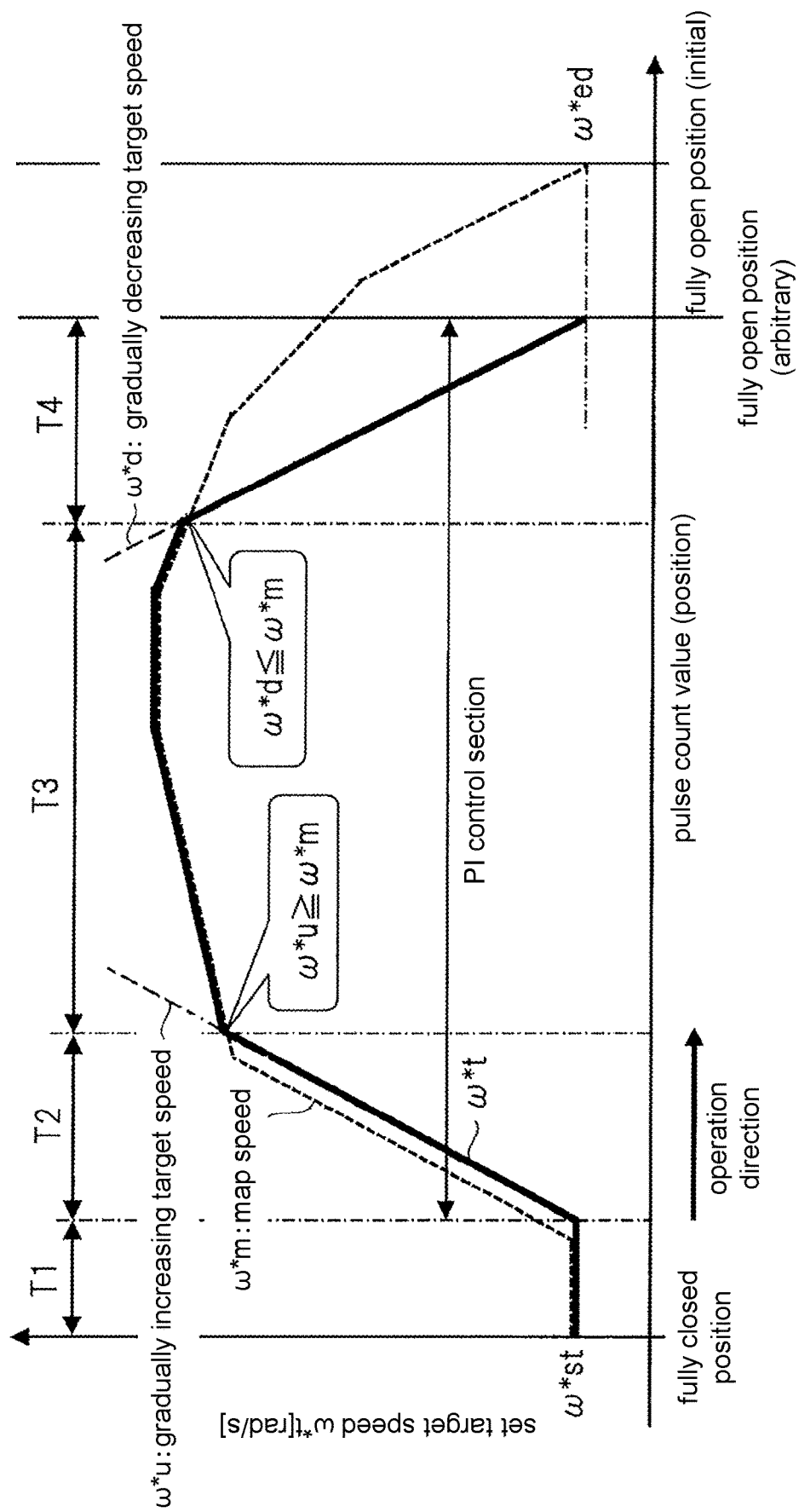
FIG. 6 is a view showing a schematic operation example at the time of the automatic opening control when the fully open position is an arbitrary fully open position in the motor control unit of FIG. 4.
Figure 7:
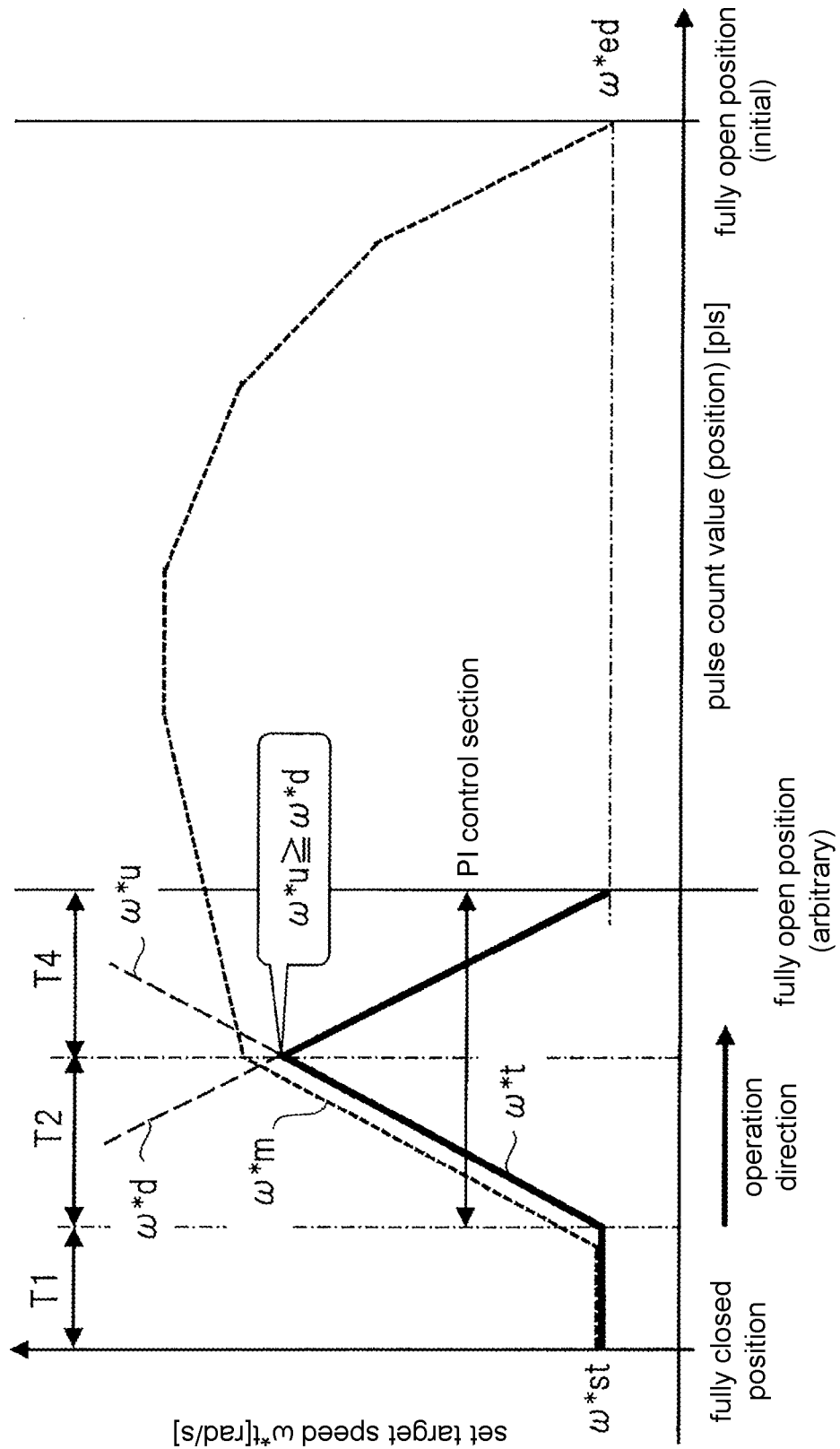
FIG. 7 is a view showing a schematic operation example at the time of the automatic opening control when the fully open position is an arbitrary fully open position in the motor control unit of FIG. 4.

FIGS. 6 and 7 are diagrams each showing a schematic operation example at the time of automatic opening control when the fully open position is an arbitrary fully open position in the motor control unit of FIG. 4. For example, in the vehicle 10 of FIG. 1, the user may want to arbitrarily determine the fully open position at the time of automatic opening control when there is an obstacle behind the tailgate 11 or the like.

Therefore, in the motor control unit 60 of FIG. 4, the storage unit MEM stores information (fully open position (arbitrary) information 67) indicating an arbitrary fully open position of the tailgate 11 set by the user. Also, in the same manner as in FIG. 5, the gradually decreasing speed calculation unit 77 calculates the gradually decreasing target speed $\omega^*d$ that decelerates at the predetermined deceleration rate $\Delta\omega d$ as the position of the tailgate 11 approaches the fully open position so that the predetermined terminal speed $\omega^*ed$ is reached at the fully open position (however, here, the arbitrary fully open position).

In FIG. 6, as a result of setting the arbitrary fully open position, as compared with the case of FIG. 5, a straight line indicating a relationship between the pulse count value and the gradually decreasing target speed $\omega^*d$ is shifted to the fully closed position side by a difference amount between the initial fully open position and the arbitrary fully open position. Along with this, in the speed map section T3, the speed sequence control unit 65 detects that the gradually decreasing target speed $\omega^*d$ becomes lower than the map speed $\omega^*m$ at a stage in which the pulse count value is small as compared with the case of FIG. 5. As a result, transition is performed from the speed map section T3 to the gradual target speed decrease section T4 at a stage closer to the fully closed position than that in the case of FIG. 5.

In FIG. 7, as a result of setting the arbitrary fully open position even closer to the fully closed position as compared with the case of FIG. 6, a straight line indicating the relationship between the pulse count value and the gradually decreasing target speed $\omega^*d$ is shifted to the fully closed position side compared to the case of FIG. 6. Along with this, in FIG. 7, unlike the case of FIG. 6, in the gradual target speed increase section T2, the speed sequence control unit 65 compares the gradually increasing target speed $\omega^*u$ with the gradually decreasing target speed $\omega^*d$ in addition to the comparison between the gradually increasing target speed $\omega^*u$ and the map speed $\omega^*m$ described in FIG. 5. Then, the speed sequence control unit 65 switches the set target speed $\omega^*t$ from the gradually increasing target speed $\omega^*u$ to the gradually decreasing target speed $\omega^*d$ at the position of the tailgate 11 at which the gradually decreasing target speed $\omega^*d$ becomes lower than the gradually increasing target speed $\omega^*u$. As a result, transition from the gradual target speed increase section T2 to the gradual target speed decrease section T4 is performed.

When the automatic opening controls as shown in FIGS. 6 and 7 are used, the opening speed of the tailgate 11 can be gradually reduced to reach the terminal speed is $\omega^*ed$ at the fully open position even when the arbitrary fully open position is set. As a result, vibration of the tailgate 11 due to the automatic opening control can be suppressed. Also, along with this, a feeling of the user can be improved. Further, as Comparative example, for example, even in a case in which the arbitrary fully open position is set in FIG. 6, when control is performed based on the map speed $\omega^*m$, the arbitrary fully open position is reached at a fast map speed $\omega^*m$ corresponding to the arbitrary fully open position. As a result, vibration of the tailgate 11 may occur. When the methods as shown in FIGS. 6 and 7 are used, such vibration can be suppressed.

Here, regarding a specific control method, for example, as can be understood from FIG. 6, when the arbitrary fully open position is determined, a relationship between the pulse count value and the gradually decreasing target speed $\omega^*d$ can be calculated back with the determined arbitrary fully open position as a reference. Therefore, a method in which a new target speed map is created by reflecting the back-calculated relationship in the existing target speed map and stores it in the storage unit MEM can be conceivable. In this case, the gradual target speed decrease section T4 in FIG. 6 is unnecessary, and the speed map section T3 can be extended to the fully open position.

However, the user may want to frequently change the arbitrary fully open position. Also, for example, there are cases in which the motor control unit want to perform a control of changing the deceleration rate ($\Delta\omega d$) (the same applies to the acceleration rate (Δωu)) according to an environment such as an inclination of the vehicle 10. In such a case, it is necessary to recreate the target speed map each time the change is made in the method of creating the new target speed map as described above. Therefore, an increase in the processing load of the motor control unit may occur. Further, as shown in FIG. 7, when transition is made from the gradual target speed increase section T2 to the gradual target speed decrease section T4 without passing through the speed map section T3, it may be difficult to apply the method itself.

Therefore, in the motor control unit 60 of FIG. 4, the map speed calculation unit 75 calculates the map speed ω*m corresponding to a detected present position of the tailgate 11 (that is, a current value of the pulse count value 71) for each predetermined control cycle (for example, 5 ms or the like). Similarly, the gradually increasing speed calculation unit 76 and the gradually decreasing speed calculation unit 77 respectively calculate the gradually increasing target speed ω*u and the gradually decreasing target speed ω*d corresponding to the current value of the pulse count value 71 for each predetermined control cycle. Further, the speed sequence control unit 65 compares the map speed ω*m with the gradually decreasing target speed ω*d as shown in FIGS. 5 and 6 and compares the gradually increasing target speed ω*u with each of the map speed ω*m and the gradually decreasing target speed ω*d as shown in FIGS. 5 and 7 for each predetermined control cycle.

Figure 8:
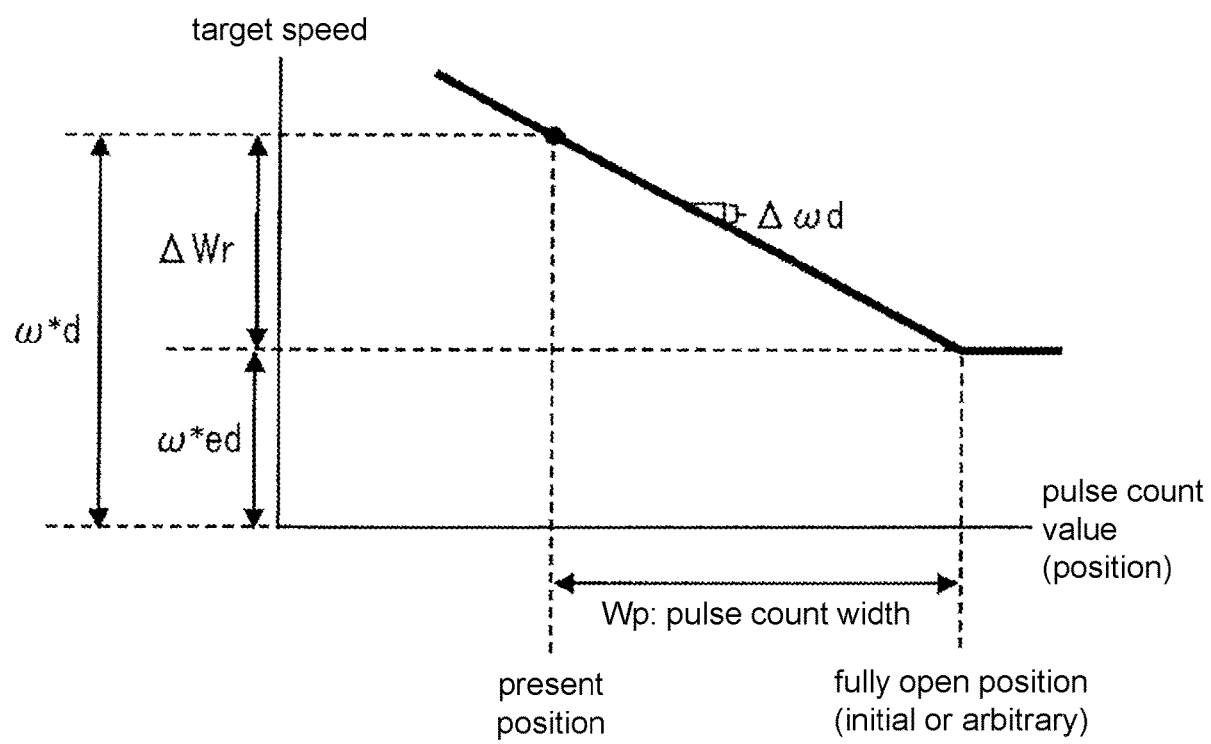
FIG. 8 is a view showing an example of a method of calculating a gradually decreasing target speed in a gradually decreasing speed calculation unit of FIG. 4.

FIG. 8 is a view showing an example of a method of calculating the gradually decreasing target speed in the gradually decreasing speed calculation unit of FIG. 4. In FIG. 8, a pulse count width "Wp" is a difference amount between the initial or arbitrary fully open position and the present position. The fully open position is fixedly determined as the pulse count value in advance, and the present position is determined by the pulse count value acquired from the position/speed detection unit 68 at a current control cycle. "ω*ed" is a predetermined terminal speed, and "Δωd" is a predetermined deceleration rate (here, a decrement in the target speed with respect to an increase of "+1" in the pulse count value). Thereby, the gradually decreasing target speed ω*d at the present position can be calculated by Expression (1). ΔWr represents Δ (gradually decreasing speed), and is equal to ω*d×Wp.

$$\omega^*d = \omega^*ed + |\Delta\omega d| \times Wp \quad (1)$$

$$= \omega^*ed + \Delta Wr$$

Further, the same applies to a calculation method of the gradually increasing target speed ω*u. In this case, using FIG. 5 as an example, a difference between the pulse count value at a control cycle at which transition is made from the gradual duty increase section T1 to the gradual target speed increase section T2 and the pulse count value at the present position may be used as the pulse count width "Wp." Also, the start speed ω*st may be used instead of the terminal speed ω*ed, and the acceleration rate Δωu may be used instead of the deceleration rate Δωd.

In this way, when the method of calculating each target speed (ω*m, ω*u, and ω*d) corresponding to the present position for each predetermined control cycle and comparing magnitudes of the target speeds for each predetermined control cycle is used, an increase in the processing load of the motor control unit 60 can be prevented unlike the method of creating the new target speed map described above. Further, the method can also be applied to such a case in FIG. 7. Regarding the processing load, for example, when the arbitrary fully open position is changed, only the value of the pulse count width "Wp" in Expression (1) simply is changed and the processing content itself of the motor control unit 60 does not change. Similarly, also when the deceleration rate Δωd is changed, only the "Δωd" of Expression (1) is simply changed but the processing content itself of the motor control unit 60 does not change.

<<Detailed Operation of Motor Control Unit>>

Figure 9:
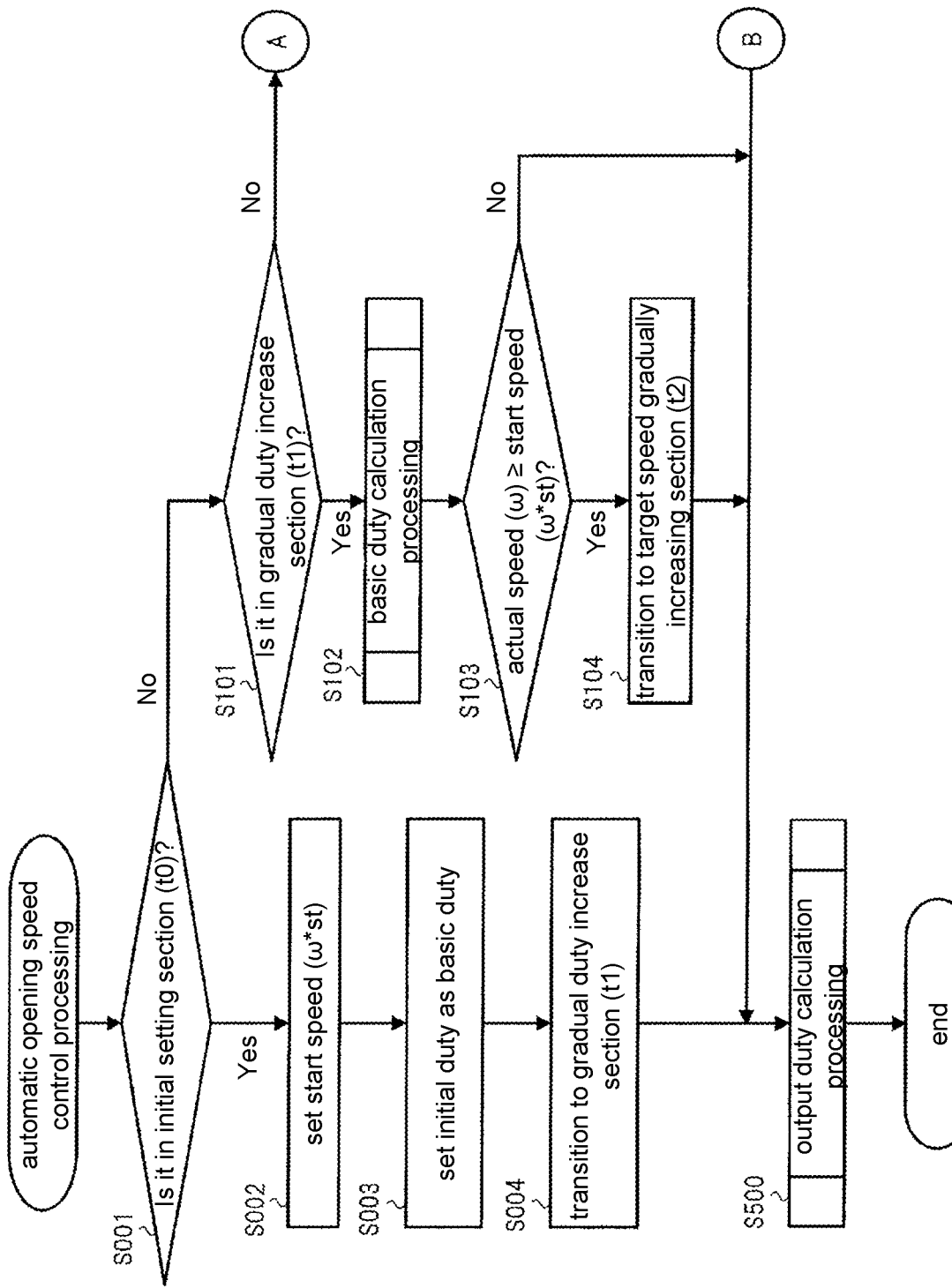
FIG. 9 is a flowchart showing an example of detailed processing content of the motor control unit of FIG. 4.
Figure 10:
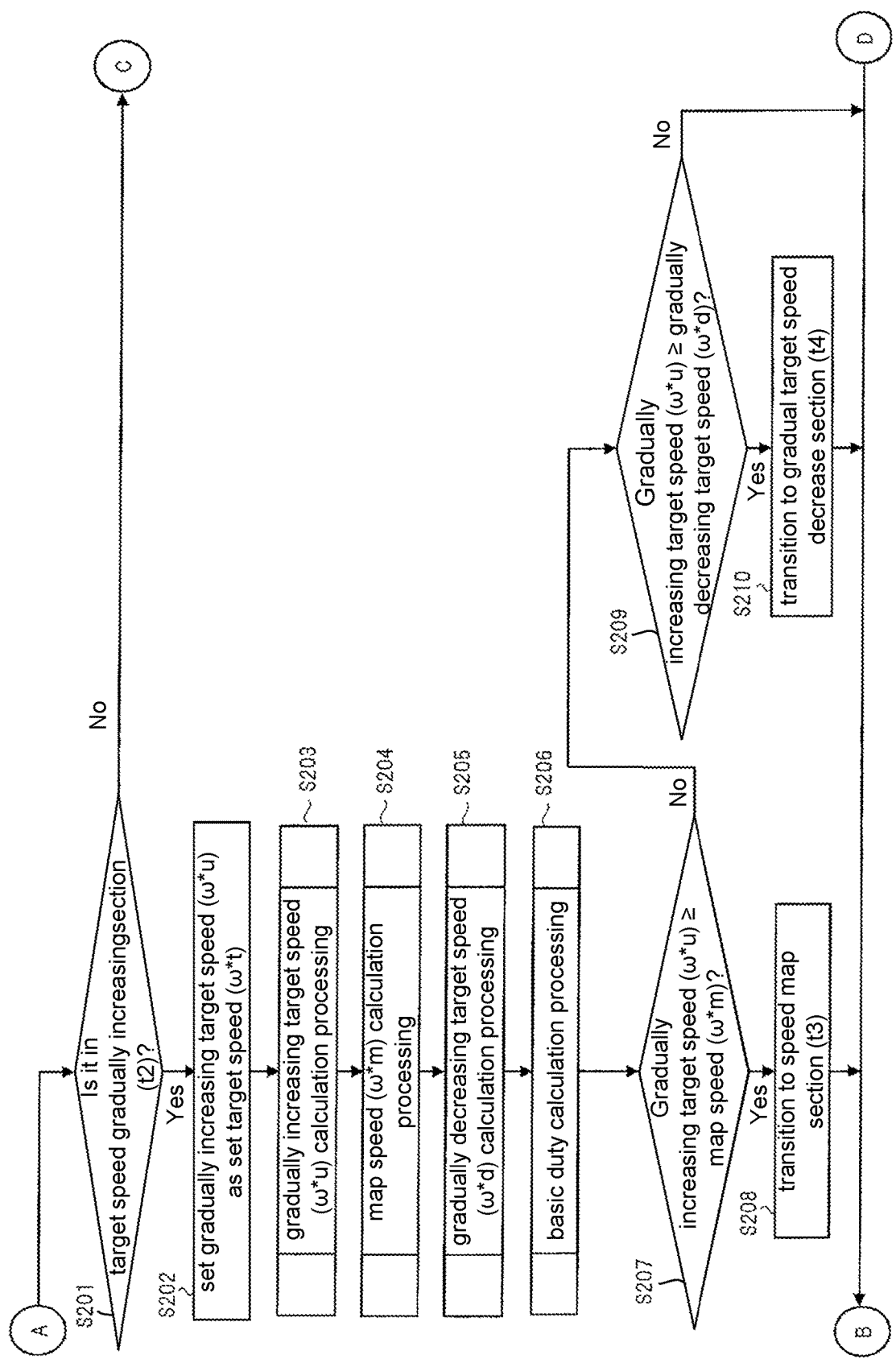
FIG. 10 is a flowchart showing an example of detailed processing content of the motor control unit of FIG. 4.
Figure 11:
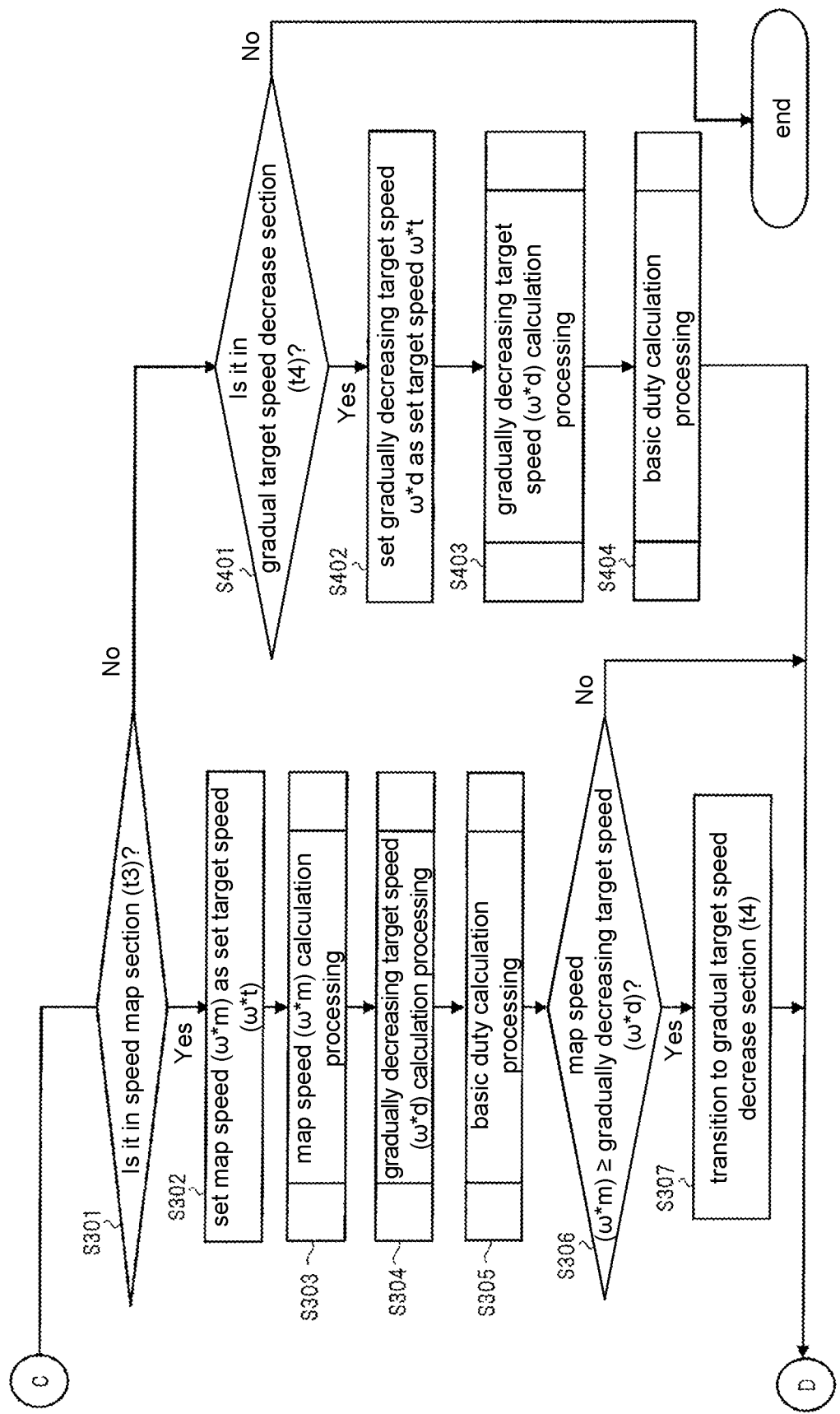
FIG. 11 is a flowchart showing an example of detailed processing content of the motor control unit of FIG. 4.

FIGS. 9, 10 and 11 are flowcharts showing an example of detailed processing contents of the motor control unit of FIG. 4. The flow is executed, for example, for each predetermined control cycle. In FIG. 9, the motor control unit 60 determines whether or not the operation is in the initial setting section is T0 (step S001). Further, the motor control unit 60 transitions the operation to the initial setting section T0 according to the automatic opening switch 81. When it is determined not to be in the initial setting section T0, processing of step S101 is performed.

On the other hand, when it is determined to be in the initial setting section T0, as described in FIG. 5, the motor control unit 60 performs setting of the predetermined start speed ω*st for each unit (step S002) and processing of setting the predetermined initial duty as the basic duty (step S003). Next, the motor control unit 60 transitions the operation to the gradual duty increase section T1 (step S004), and then performs output duty calculation processing for the initial duty determined in step S003 using the output duty calculation unit 62 (step S500).

In step S101, the motor control unit 60 determines whether or not the operation is in the gradual duty increase section T1. When it is determined not to be in the gradual duty increase section T1, processing of step S201 in FIG. 10 is performed. When it is determined to be in the gradual duty increase section T1, the motor control unit 60 performs basic duty calculation processing using the gradual duty increase control unit 63 as described in FIG. 5 (step S102). Next, the motor control unit 60 determines whether or not the actual speed ω of the motor MT has reached the start speed ω*st using the speed sequence control unit 65 (step S103).

When it is determined to have reached the start speed ω*st in step S103, the motor control unit 60 transitions the operation to the gradual target speed increase section T2 (step S104), and then performs output duty calculation processing for the basic duty determined in step S102 using the output duty calculation unit 62 (step S500). On the other hand, when it is determined to have not reached the start speed ω*st, the motor control unit 60 performs the output duty calculation processing for the basic duty determined in step S102 using the output duty calculation unit 62 (step S500). In this case, the processing of step S102 (that is, processing of increasing the duty by one level) or the like is performed again in the next control cycle.

In step S201 of FIG. 10, the motor control unit 60 determines whether or not the operation is in the gradual target speed increase section T2. When it is determined not to be in the gradual target speed increase section T2, processing of step S301 of FIG. 11 is performed. When it is determined to be in the gradual target speed increase section T2, the motor control unit 60 sets the gradually increasing target speed ω*u as the set target speed ω*t using the speed sequence control unit 65 (step S202). Next, the motor control unit 60 calculates the gradually increasing target speed ω*u, the map speed ω*m, and the gradually decreasing target speed ω*d using the gradually increasing speed calculation unit 76, the map speed calculation unit 75, and the gradually decreasing speed calculation unit 77, respectively (steps S203 to S205).

Next, the motor control unit 60 performs basic duty calculation processing by inputting the set target speed ω*t (that is, the gradually increasing target speed ω*u) to the PI compensator 64 (step S206). Next, the motor control unit 60 determines whether or not the gradually increasing target speed ω*u has reached the map speed ω*m using the speed sequence control unit 65 (step S207). When it is determined to have reached the map speed ω*m, the motor control unit 60 transitions the operation to the speed map section T3 (step S208), and then performs output duty calculation processing for the basic duty determined in step S206 using the output duty calculation unit 62 (step S500 in FIG. 9).

On the other hand, in step S207, when the gradually increasing target speed ω*u is determined to have not reached the map speed ω*m, the motor control unit 60 uses the speed sequence control unit 65 to determine whether or not the gradually decreasing target speed ω*d is lower than the gradually increasing target speed ω*u as illustrated in FIG. 7 (step S209). When the gradually decreasing target speed ω*d is determined to be lower than the gradually increasing target speed ω*u, the motor control unit 60 transitions the operation to the gradual target speed decrease section T4 (step S210), and then performs the output duty calculation processing for the basic duty determined in step S206 using the output duty calculation unit 62 (step S500 in FIG. 9).

On the other hand, in step S209, when the gradually decreasing target speed ω*d is determined to be higher than the gradually increasing target speed ω*u, the motor control unit 60 performs the output duty calculation processing for the basic duty determined in step S206 using the output duty calculation unit 62 (step S500 in FIG. 9). In this case, the processing of step S206 (that is, processing of accelerating the set target speed ω*t according to an increment of the pulse count value) or the like is performed again in the next control cycle.

In step S301 of FIG. 11, the motor control unit 60 determines whether or not the operation is in the speed map section T3. When it is determined not to be in the speed map section T3, processing of step S401 is performed. When it is determined to be in the speed map section T3, the motor control unit 60 sets the map speed ω*m as the set target speed ω*t using the speed sequence control unit 65 (step S302). Next, the motor control unit 60 performs calculation of the map speed ω*m and the gradually decreasing target speed ω*d using the map speed calculation unit 75 and the gradually decreasing speed calculation unit 77, respectively (steps S303 and S304).

Next, the motor control unit 60 performs basic duty calculation processing by inputting the set target speed ω*t (that is, the map speed ω*m) to the PI compensator 64 (step S305). Next, the motor control unit 60 uses the speed sequence control unit 65 to determine whether or not the gradually decreasing target speed ω*d is lower than the map speed ω*m as shown in FIGS. 5 and 6 (step S306).

In step S306, when the gradually decreasing target speed ω*d is determined to be lower than the map speed ωm, the motor control unit 60 transitions the operation to the gradual target speed decrease section T4 (step S307), and then performs output duty calculation processing for the basic duty determined in step S305 using the output duty calculation unit 62 (step S500 in FIG. 9). On the other hand, when the gradually decreasing target speed ω*d is determined to be higher than the map speed ωm, the motor control unit 60 performs the output duty calculation processing for the basic duty determined in step S305 using the output duty calculation unit 62 (step S500 in FIG. 9). In this case, the processing of step S305 (that is, processing of determining the set target speed ω*t based on the target speed map 66) or the like is performed again in the next control cycle.

In step S401, the motor control unit 60 determines whether or not the operation is in the gradual target speed decrease section T4. When it is determined not to be in the gradual target speed decrease section T4, the motor control unit 60 ends the processing. A case in which the operation is not in the gradual target speed decrease section T4 in step S401 corresponds to a case in which the fully open position has been reached. On the other hand, when the operation is determined to be in the gradual target speed decrease section T4, the motor control unit 60 sets the gradually decreasing target speed ω*d as the set target speed ω*t using the speed sequence control unit 65 (step S402). Next, the motor control unit 60 performs calculation of the gradually decreasing target speed ω*d using the gradually decreasing speed calculation unit 77 (step S403).

Next, the motor control unit 60 performs basic duty calculation processing by inputting the set target speed ω*t (that is, the gradually decreasing target speed ω*d) to the PI compensator 64 (step S404). Next, the motor control unit 60 performs output duty calculation processing for the basic duty determined in step S404 using the output duty calculation unit 62 (step S500 in FIG. 9). Thereafter, the processing of step S404 (that is, processing of decelerating the set target speed ω*t according to an increment of the pulse count value) or the like is performed again in the next control cycle until the fully open position is reached.

<<Main Effects of Embodiment>>

As described above, when the vehicle door opening/closing device of the embodiment is used, typically, vibration of the door during the automatic opening control can be suppressed. As a result, a feeling of the user can be improved.

The present invention is not limited to the above-described embodiment, and various modifications can be made within the scope not departing from the gist thereof as a matter of course. For example, a brushed DC motor is used as the motor MT in the above-described embodiment, but the present invention is not particularly limited thereto, and various motors such as a brushless DC motor can be used. Also, an application example of the tailgate (back door) 11, which is an example of the door, has been shown in the above-described embodiment, but the present invention can be similarly applied to doors of various types such as, for example, a sliding door.

Further, here, the position of the tailgate 11 has been detected based on the detection result of the motor shaft sensor 28, but, similarly, an output shaft sensor may be provided to the output shaft (output shaft) 35 of FIG. 3, and the position of the tailgate 11 may be detected based on a detection result thereof. Also, in the example of FIG. 3, a magnetic rotary encoder has been used as the motor shaft sensor 28, but a sensorless method in which position information or speed information of the motor is obtained by using a resolver or, in some cases, by detecting an induced voltage of the motor MT can also be used.

In addition, materials, shapes, dimensions, numbers, installation positions, or the like of the constituent elements in the above-described embodiment are arbitrary as long as the present invention can be achieved, and are not limited to the above-described embodiment.

What is claimed is:

1. A vehicle door opening/closing control device comprising:
   a motor which outputs a driving force to open and close a door; and
   a motor control unit which sets a target speed of the motor at a time of automatic opening control of the door and controls a rotation state of the motor according to a set target speed which is the target speed that has been set, wherein
   the motor control unit includes:
   a storage unit which stores a target speed map which defines a relationship between a position of the door and the target speed of the motor on the premise that a fully open position of the door is an initial fully open position, and information indicating an arbitrary fully open position of the door set by a user;
   a map speed calculation unit which calculates a map speed serving as the target speed of the motor based on the target speed map; wherein
      the map speed calculation unit calculates the map speed corresponding to a detected present position of the door for each predetermined first control cycle, the gradually decreasing speed calculation unit calculates the gradually decreasing target speed corresponding to the present position for each predetermined first control cycle, and the speed sequence control unit compares the map speed with the gradually decreasing target speed for each first predetermined control cycle;
   a gradually decreasing speed calculation unit which calculates a gradually decreasing target speed that decelerates at a predetermined deceleration rate as a position of the door approaches the arbitrary fully open position so that a predetermined terminal speed is reached at the arbitrary fully open position; wherein
      the gradually decreasing target speed is calculated by: "$\omega^* d = \omega^* ed + |\Delta\omega d| \times Wp$",
      where a difference amount between the arbitrary fully open position and the present position is "$Wp$," the terminal speed is "$\omega^* ed$," and the deceleration rate is "$\Delta\omega d$"
   a speed sequence control unit which compares the map speed with the gradually decreasing target speed and switches the set target speed from the map speed to the gradually decreasing target speed at a position of the door at which the gradually decreasing target speed becomes lower than the map speed.

2. The vehicle door opening/closing control device according to claim 1, wherein the motor control unit further includes a gradually increasing speed calculation unit which calculates a gradually increasing target speed that accelerates at a predetermined acceleration rate as a position of the door approaches the arbitrary fully open position with a predetermined start speed as a starting point, and the speed sequence control unit sets the set target speed as the gradually increasing target speed when a detected actual speed of the motor has reached the start speed, compares the map speed with the gradually increasing target speed, and switches the set target speed from the gradually increasing target speed to the map speed at a position of the door at which the gradually increasing target speed becomes higher than the map speed.

3. The vehicle door opening/closing control device according to claim 2, wherein the speed sequence control unit further compares the gradually increasing target speed with the gradually decreasing target speed, and switches the set target speed from the gradually increasing target speed to the gradually decreasing target speed at a position of the door at which the gradually decreasing target speed becomes lower than the gradually increasing target speed.

4. The vehicle door opening/closing control device according to claim 3, wherein the gradually increasing speed calculation unit calculates the gradually increasing target speed corresponding to the present position for each second predetermined control cycle, and the speed sequence control unit compares the gradually increasing target speed with each of the map speed and the gradually decreasing target speed for each predetermined second control cycle.

5. The vehicle door opening/closing control device according to claim 1, wherein the door is a tailgate.

* * * * *